United States Patent
Wen et al.

(10) Patent No.: US 8,388,208 B2
(45) Date of Patent: Mar. 5, 2013

(54) METHOD AND STRUCTURE FOR UNIFORMING LIGHT EMITTED FROM BACKLIGHT MODULE

(75) Inventors: Ming Huang Wen, Chung-Li (TW);
Chun Pin Chang, Chung-Li (TW);
Chan Chang Ni, Chung-Li (TW);
Tsung Yung Hung, Chung-Li (TW);
Chung Lin Tsai, Chung-Li (TW)

(73) Assignee: Global Lighting Technologies (Taiwan) Inc., Chung-Li (TW)

( * ) Notice: Subject to any disclaimer, the term of this patent is extended or adjusted under 35 U.S.C. 154(b) by 381 days.

(21) Appl. No.: 12/826,687

(22) Filed: Jun. 30, 2010

(65) Prior Publication Data
US 2011/0122649 A1   May 26, 2011

(30) Foreign Application Priority Data

Nov. 23, 2009 (TW) ............................. 98139687 A
Apr. 28, 2010 (TW) ............................. 99113526 A (51) Int. Cl.
*F21V 8/00* (2006.01)
*F21V 7/04* (2006.01)
*F21V 7/05* (2006.01)

(52) U.S. Cl. ........ 362/615; 362/619; 362/627; 362/625; 362/606

(58) Field of Classification Search .................. 362/606, 362/607, 608, 610, 615–629
See application file for complete search history.

(56) References Cited

U.S. PATENT DOCUMENTS

| 5,584,556 | A | * | 12/1996 | Yokoyama et al. | 362/625 |
| 6,099,134 | A | * | 8/2000 | Taniguchi et al. | 362/618 |
| 7,090,389 | B2 | * | 8/2006 | Parker et al. | 362/627 |
| 7,298,434 | B2 | * | 11/2007 | Jeon | 349/62 |
| 7,559,683 | B2 | * | 7/2009 | Lee | 362/620 |
| 2004/0145915 | A1 | * | 7/2004 | Kim et al. | 362/559 |
| 2011/0228556 | A1 | * | 9/2011 | Wang et al. | 362/606 |

FOREIGN PATENT DOCUMENTS

| CN | 2496052 Y | * | 6/2002 |
| TW | 321111 U | * | 10/2007 |

* cited by examiner

*Primary Examiner* — Mariceli Santiago
(74) *Attorney, Agent, or Firm* — Lin & Associates IP, Inc.

(57) ABSTRACT

A method and a structure for improving the uniformity of light emitted from a backlight module are provided. In accordance with the present invention, a plurality of optical microstructures are intermittently distributed on an LGP of a backlight module. Each of the microstructures further includes a plurality of optical sub-microstructures. The optical microstructures and the optical sub-microstructures are distributed on the LGP with varied distribution intensities in three dimensions, such that at where the optical microstructures and the optical sub-microstructures are distributed with a larger distribution intensities the LGP refracts and reflects more light, and at where the optical microstructures and the optical sub-microstructures are distributed with a smaller distribution intensities the LGP refracts and reflects less light. In such a way, by designing particular distribution intensities of the optical microstructures and the optical sub-microstructures, the light emitted from the LGP can be uniformed.

42 Claims, 14 Drawing Sheets

METHOD AND STRUCTURE FOR UNIFORMING LIGHT EMITTED FROM BACKLIGHT MODULE

BACKGROUND OF THE INVENTION

1. Field of the Invention

The present invention relates generally to a method and a structure for improving the uniformity of light emitted from a backlight module, and more particularly to a method and a structure of splicing a plurality of small-size light guide plates (LGP) into a large-size LGP. Typically, when two adjacent small-size LGPs are spliced at a splicing portion, the splicing portion usually presents a dielectric index different from the small-size LGPs. As such, when the large-size splicing LGP emits light, the dielectric index difference would cause refraction of the light and presents a bright line at the splicing portion. The present invention is adapted for eliminating the bright lines caused at the splicing portions between adjacent small-size LGPs.

2. The Prior Arts

Liquid crystal displays (LCD) have been widely used by many electronic products, such as notebook computers, displays, cell phones, and LCD televisions. Typically, an LCD includes a backlight module providing a light source for displaying images. Therefore, backlight modules are necessary components for LCD products. Further, backlight modules are also employed in some non-LCD products which desire flat light emitting effects.

Generally, a conventional backlight module of an LCD includes an LGP and a light source. Some LCD televisions employ a bottom lighting structure in which a lamp is provided at a backside of the LGP serving as a light source. However, the LCD televisions employing such a structure would be dimensionally thicker. In order to obtain a thinner LCD television, a conventional technology is to employ light emitting diodes (LED) serving as the light source of the backlight module. In accordance with such a structure, a plurality of LEDs are provides at a lateral side of the LGP. A reflective sheet is provided at a first surface of the LGP. A second surface of the LGP positioned opposite to the first surface serves as a light emitting surface. A plurality of optical sheets including a diffusing sheet and a prism sheet are provided at the second surface of the LGP. The LEDs, the LGP, the reflective sheet, and the optical sheets are laminated together, and then formed by an outer frame. In operation, the LEDs project light entering the LGP from the lateral side. A part of the light is reflected by the reflective sheet. The light sequentially passes through the diffusing sheet and the prism sheet and is outputted thereby.

However, the LGP as foregoing discussed is an optical apparatus, which requires a very high optical precision and functionality. As such, a large-size LGP is often more difficult to fabricate than a small-size LGP, and thus has a higher fabrication cost. Hence, a conventional technology is to splice a plurality of small-size LGPs into a large-size LGP.

Figure 1:
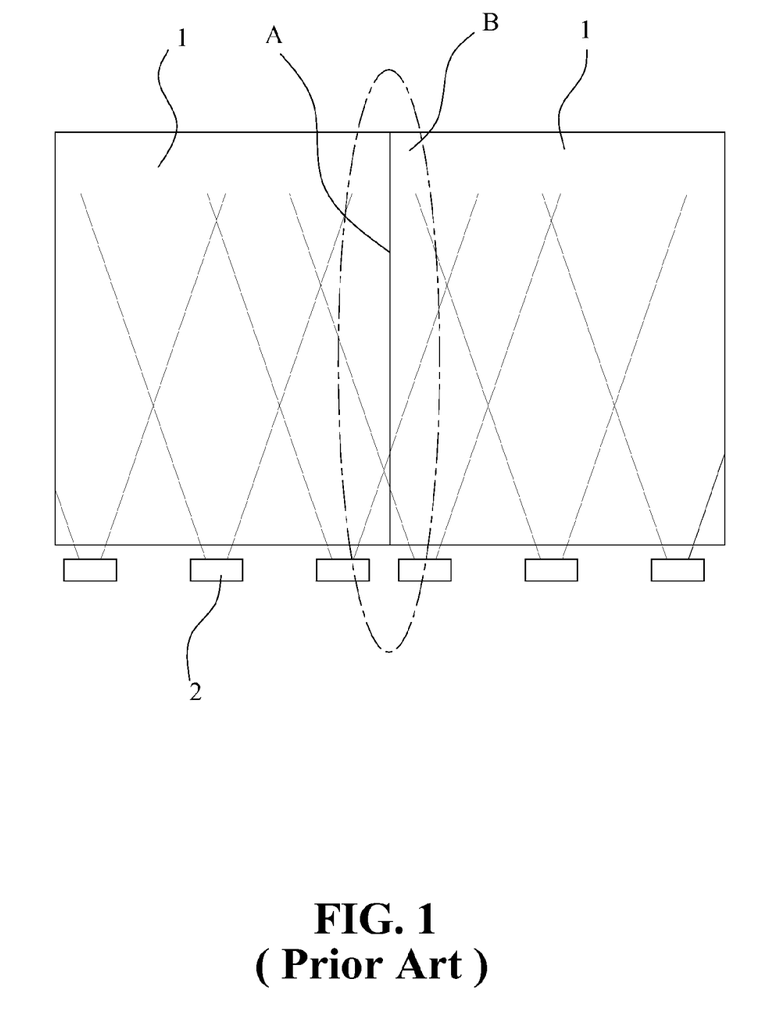
FIG. 1 is a schematic diagram illustrating a conventional splicing LGP of a backlight module.

As shown in FIG. 1, there is shown a large-size splicing LGP structure constituted of two small-size LGPs 2. Each of the small-size LGPs 2 has at least one splicing edge A. The splicing edges A of the two small-size LGPs 2 are individually polished. Then, the splicing edges A of the two small-size LGPs 2 are spliced in close contact. An LED light source 2 is provided at a lateral side of each of the small-size LGPs 1. The LED light source 2 projects light into the small-size LGPs 1, the light is transmitted into the small-size LGPs 1, and is then outputted from an upper surface of the small-size LGPs 1, thus obtaining a flat light outputting performance as desired.

Figure 2:
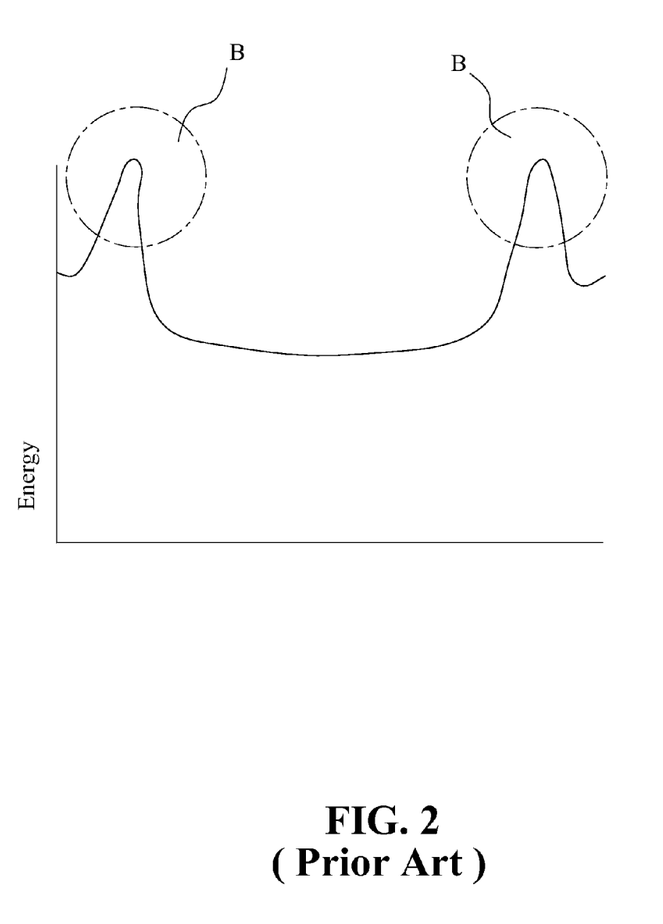
FIG. 2 is a brightness distribution diagram of the conventional splicing LGP of FIG. 1.

However, the splicing portion of the two adjacent splicing edges A usually presents a dielectric index different from the bodies of the small-size LGPs 1. As such, when the light reaches the splicing portion, the dielectric index difference would cause refraction of the light and presents a bright line area B having a brightness higher than an average value at the splicing portion as shown in FIG. 2. In general, it causes a non-uniform brightness of the large-size LGP.

SUMMARY OF THE INVENTION

Accordingly, a primary objective of the present invention is to provide a solution for solving the problem of a large-size splicing LGP having a bright line area having brightness higher than an average value at the splicing portion.

A further objective of the present invention is to further improve the uniformity of the light emitted from a large-size splicing LGP.

According to the present invention, a plurality of optical microstructures are intermittently distributed on an LGP of a backlight module. Each of the microstructures further includes a plurality of optical sub-microstructures. The optical microstructures and the optical sub-microstructures are distributed on the LGP with varied distribution intensities in three dimensions, such that at where the optical microstructures and the optical sub-microstructures are distributed with a larger distribution intensities the LGP refracts and reflects more light, and at where the optical microstructures and the optical sub-microstructures are distributed with a smaller distribution intensities the LGP refracts and reflects less light. In such a way, by designing particular distribution intensities of the optical microstructures and the optical sub-microstructures, the light emitted from the LGP can be uniformed. Specifically, when such a design is applied for uniforming the light emitted from a splicing LGP, the optical microstructures and the optical sub-microstructure are correspondingly distributed in accordance with the bright line area, thus visually eliminating the bright lines caused at the splicing portions between adjacent small-size LGPs.

According to an embodiment of the present invention, an LGP has a light input surface, a light emitting surface and an opposite surface opposite to the light emitting surface. A plurality of optical microstructures are provided at the light emitting surface, or the opposite surface, or both of the light emitting surface and the opposite surface. At least one light source is provided at the light input surface of the LGP. Each of the optical microstructure is constituted of a plurality of optical sub-microstructures. The optical microstructures are distributed with a distribution intensity on the LGP. The distribution intensity of the optical microstructures increases as the optical microstructures are farther from the light source along X-axis and Y-axis. The optical sub-microstructures are constituted of protrusions protruded over an LGP surface along Z-axis or recesses recessed from the LGP surface along Z-axis. Each of the protrusions has a height along Z-axis, or each of the recesses has a depth along Z-axis. The heights and/or depths of the protrusions and/or recesses increase as the protrusions and/or recesses are farther from the light source. The optical sub-microstructures are distributed on each optical microstructure in a manner similar to that of the optical microstructures distributed on the LGP.

According to an aspect of the embodiment, the optical microstructures can be formed with square shapes, rectangular shapes, rhombus shapes, round shapes, elliptical shapes, triangle shapes, wave shapes or the like, or a combination of geometrical shapes regularly or irregularly arranged.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawing illustrates embodiments of the invention and, together with the description, serves to explain the principles of the invention.

Figure 3:
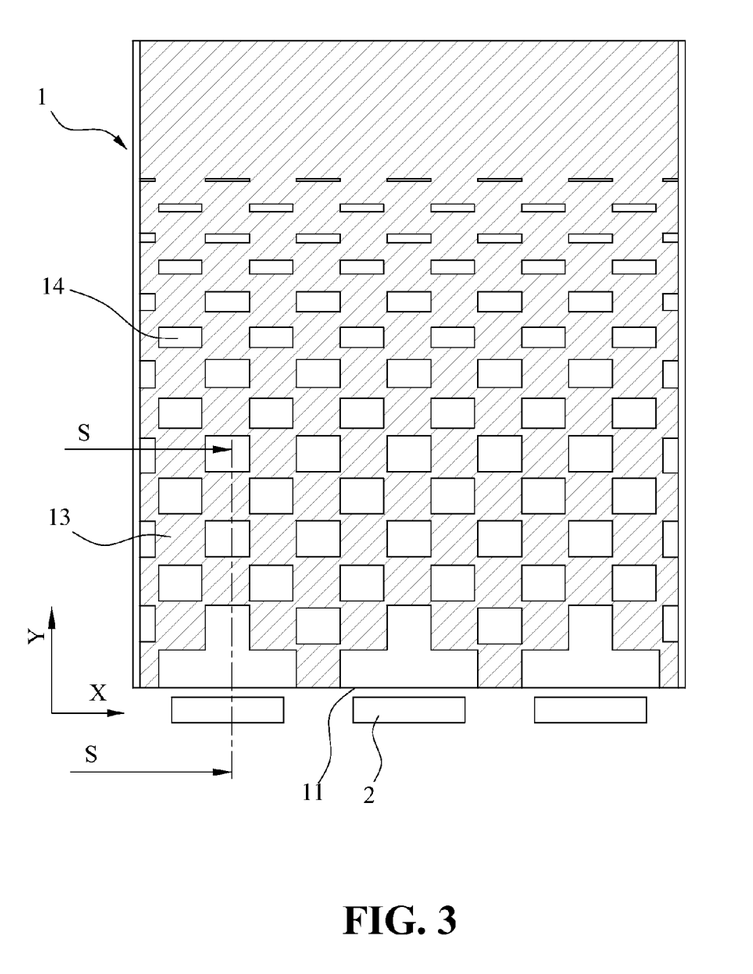
FIG. 3 is a top view of an LGP according to a first embodiment of the present invention.
Figure 4:
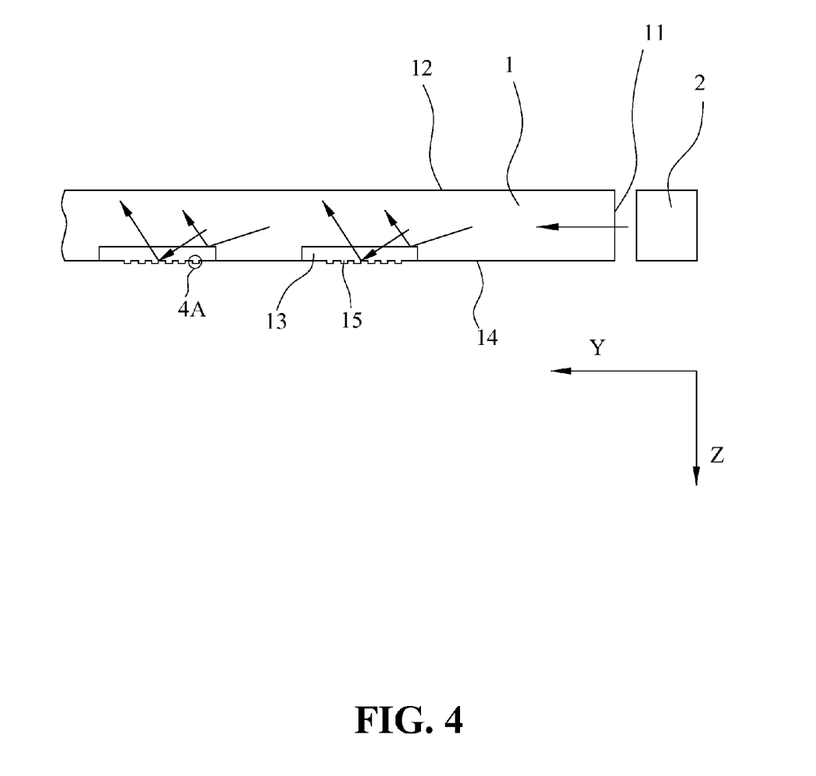
FIG. 4 is a partial cross-sectional view of the LGP of FIG. 3 along line S-S.

FIG. 3 is a top view of an LGP according to a first embodiment of the present invention. FIG. 4 is a partial cross-sectional view of the LGP of FIG. 3 along line S-S. Referring to FIGS. 3 and 4, the present invention provides a method and a structure for improving the uniformity light emitted from a backlight module. The backlight module includes a light guide plate (LGP) 1. The LGP includes a light input surface 11 configured at least one lateral side of the LGP 1. The LGP has a first surface and a second surface configured opposite to the first surface. Each of the first surface and the second surface has a larger area than the lateral side of the LGP 1 at which the light input surface 11 is configured. The first surface serves as a light emitting surface 12. Preferably, optical sheets such as brightness enhancement sheet and prism sheet are provided at the light emitting surface 12. A plurality of optical microstructures 13 are configured at the light emitting surface 12 or the second surface (hatched area in FIG. 3). Alternatively, the optical microstructures 13 can also be configured at both of the light emitting surface 12 and the second surface. Corresponding to the light input surface 11 of the LGP 1, at least one light source 2 is provided.

Each optical microstructure 13 is further constituted of optical sub-microstructures 15. The optical microstructures 13 are distributed with a distribution intensity on the LGP 1. The distribution intensity of the optical microstructures 13 increases as the optical microstructures 13 are farther from the light source 2 along X-axis and Y-axis, where X-axis is defined along the lateral side of the LGP 1 at which the light input surface 11 is configured, and Y-axis is defined along another lateral side of the LGP1 which is substantially perpendicular with the X-axis.

Figure 4A:
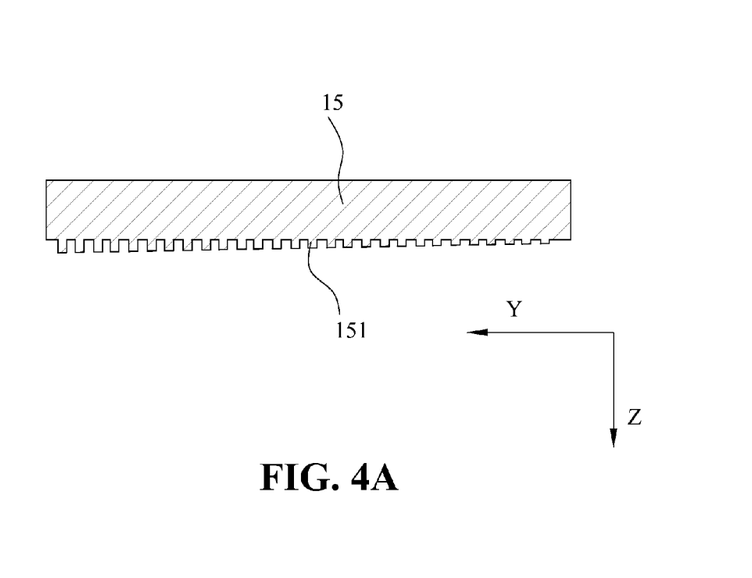
FIG. 4A is a partial enlarged view of 4A area shown in FIG. 4 for illustrating the optical sub-microstructures which are protrusions.
Figure 4B:
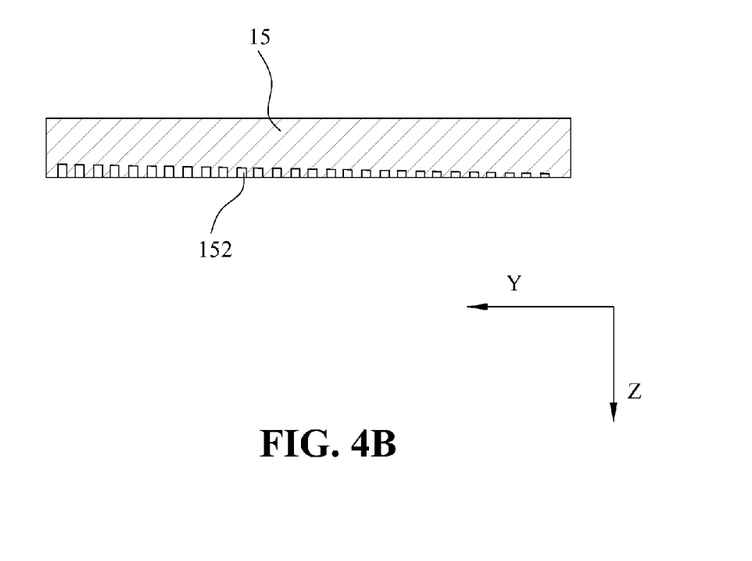
FIG. 4B is a partial enlarged view of 4A area shown in FIG. 4 for illustrating the optical sub-microstructures which are recesses.

The optical sub-microstructures 15 are constituted of protrusions 151 protruded over an LGP surface along Z-axis as shown in FIG. 4A, or recesses 152 recessed from the LGP surface along Z-axis as shown in FIG. 4B, where Z-axis is defined as to be perpendicular with X-axis and Y-axis. Each of the protrusions 151 has a height along Z-axis, or each of the recesses 152 has a depth along Z-axis. The heights and/or depths of the protrusions 151 and/or recesses 152 increase as the protrusions 151 and/or recesses 152 are farther from the light source 2. An area of the LGP 1 distributed with a larger intensity of the optical microstructures 13 and/or optical sub-microstructure 15 is capable of refracting and reflecting more light, and an area of the LGP 1 distributed with a smaller intensity of the optical microstructures 13 and/or optical sub-microstructure 15 is only capable of refracting and reflecting less light. In such a way, the LGP 1 is adapted for emitting light more uniformly.

Figure 7:
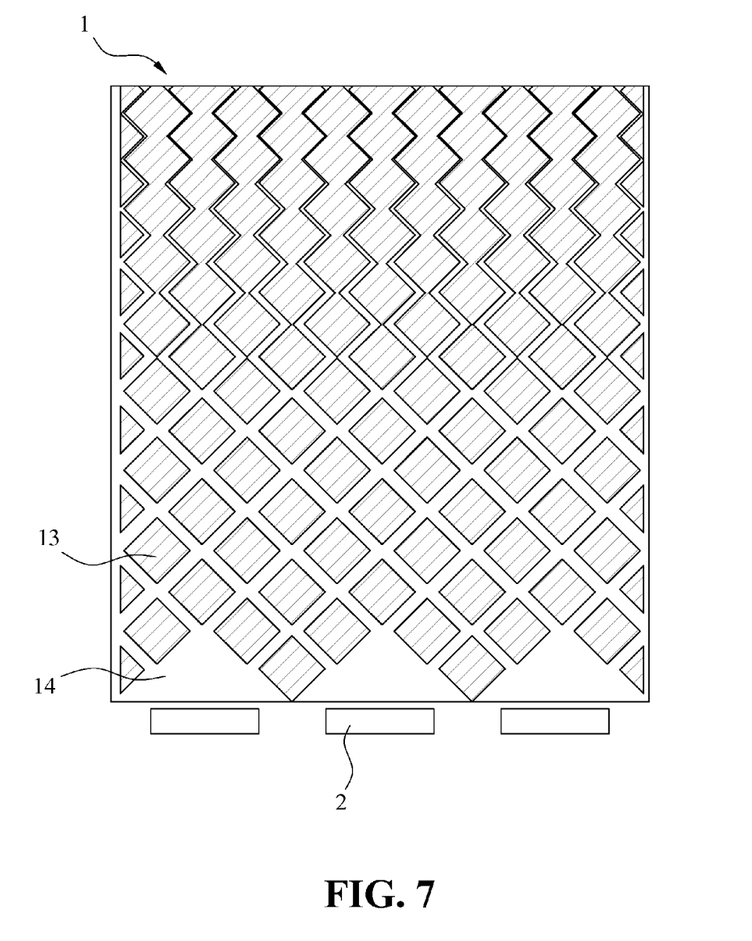
FIG. 7 is a top view of an LGP according to a second embodiment of the present invention.
Figure 8:
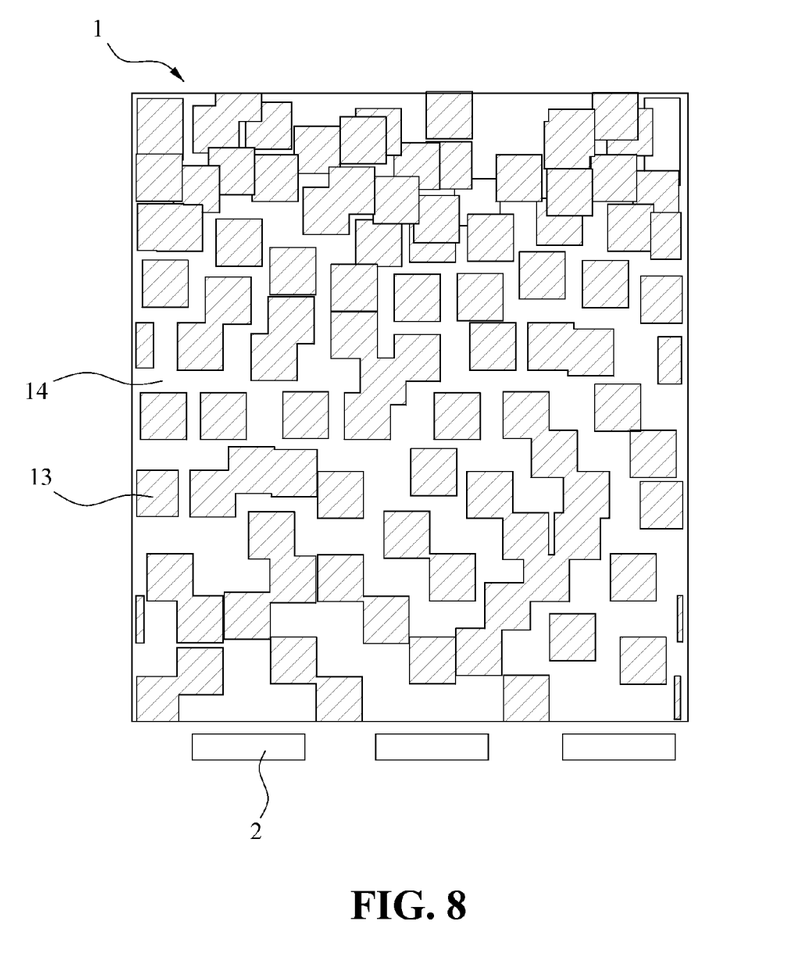
FIG. 8 is a top view of an LGP according to a third embodiment of the present invention.
Figure 9:
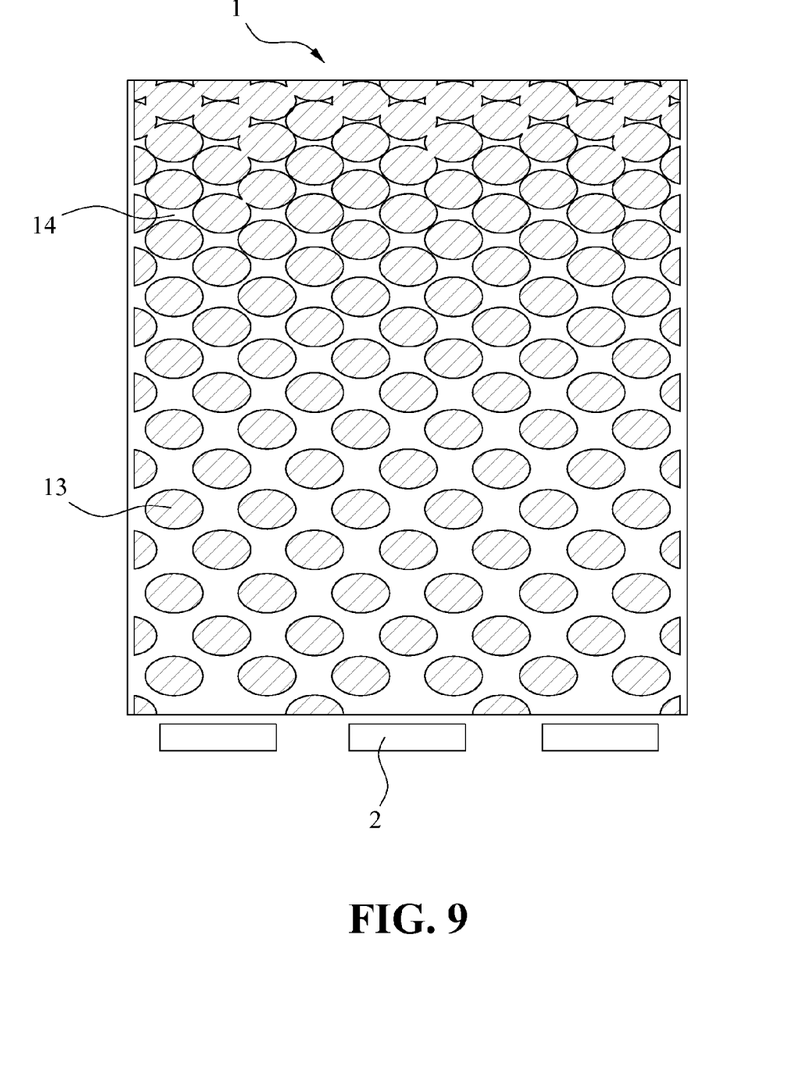
FIG. 9 is a top view of an LGP according to a fourth embodiment of the present invention.
Figure 10:
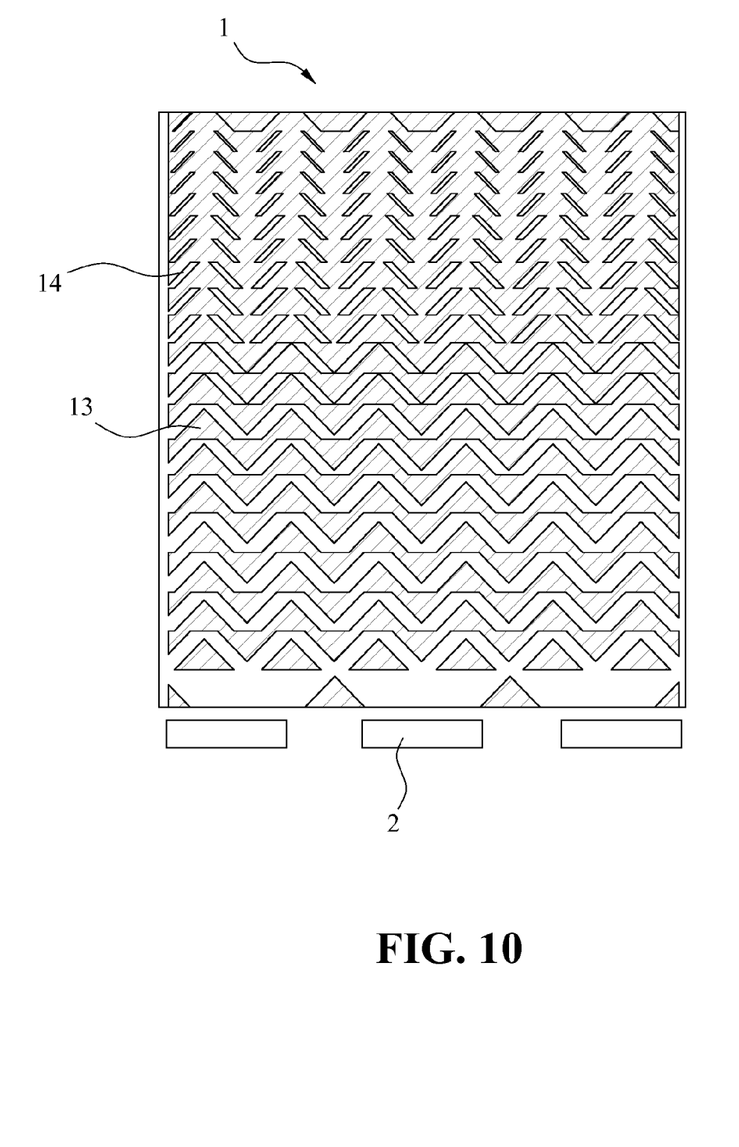
FIG. 10 is a top view of an LGP according to a fifth embodiment of the present invention.
Figure 11:
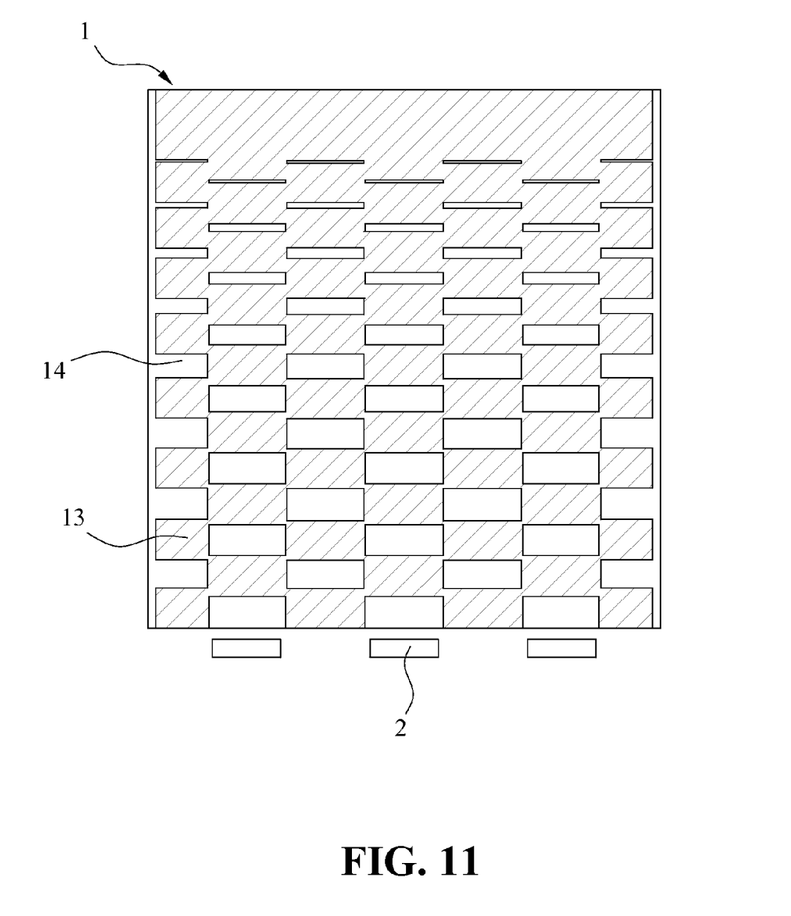
FIG. 11 is a top view of an LGP according to a sixth embodiment of the present invention.

FIG. 7 is a top view of an LGP according to a second embodiment of the present invention. FIG. 8 is a top view of an LGP according to a third embodiment of the present invention. FIG. 9 is a top view of an LGP according to a fourth embodiment of the present invention. FIG. 10 is a top view of an LGP according to a fifth embodiment of the present invention. FIG. 11 is a top view of an LGP according to a sixth embodiment of the present invention. Referring to FIGS. 3 and 7-13, the optical microstructures 13 can be formed with square shapes as shown in FIG. 3, rhombus shapes as shown in FIG. 7, irregularly arranged square shapes as shown in FIG. 8, elliptical shapes as shown in FIG. 9, triangle shapes as shown in FIG. 10, rectangular shapes as shown in FIG. 11, or even round shapes, trapezoid shapes, or wave shapes or the like. At least some of the optical microstructures 13 are partially jointed with others, and between the adjacent optical microstructures 13, original flat structures 14 of the LGP surface are remained. A distribution intensity of the flat structures 14 of the LGP surface decreases as the flat structures 14 are farther from the light source 2.

The optical sub-microstructures 15 are distributed on each optical microstructure 13 in a manner similar to that of the optical microstructures distributed on the LGP. For example, as shown in FIG. 4, the optical sub-microstructures 15 distributed on the optical microstructure 13 in a same manner as the optical microstructures 13 distributed on the LGP 1.

Figure 12:
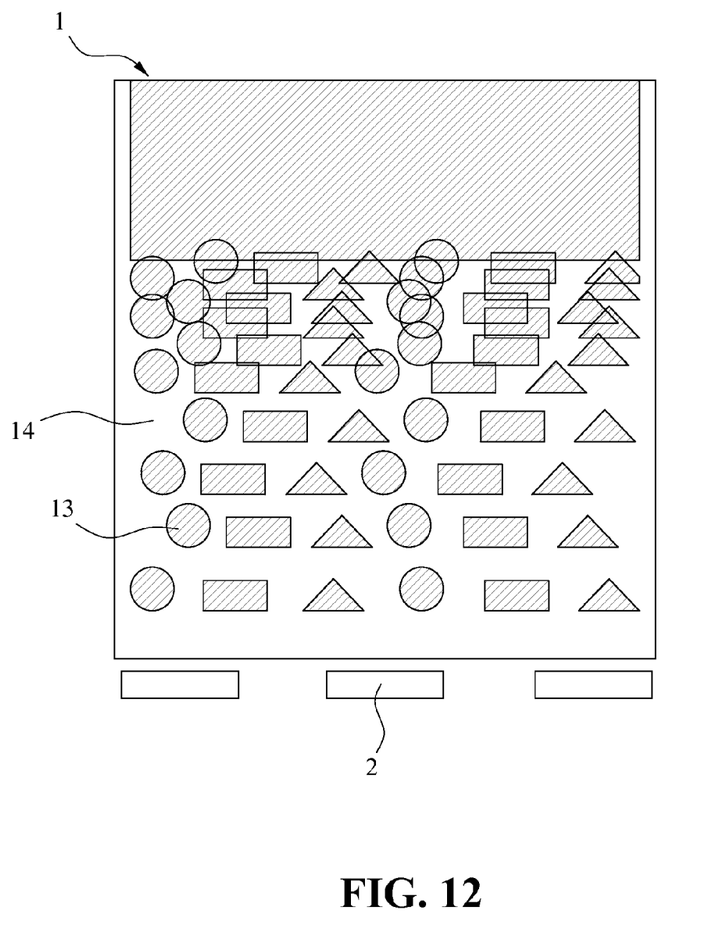
FIG. 12 is a top view of an LGP according to a seventh embodiment of the present invention.
Figure 13:
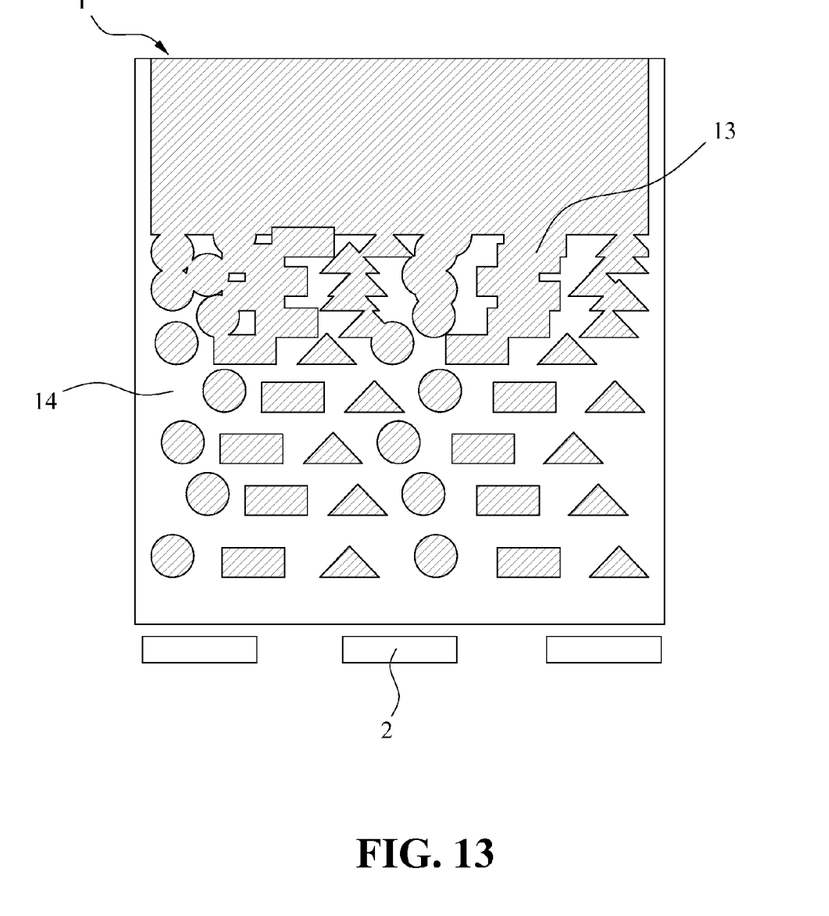
FIG. 13 is a top view of an LGP according to an eighth embodiment of the present invention.

According to a further embodiment of the present invention, the optical microstructures 13 can also be composed of different shapes distributed regularly or irregularly. FIG. 12 is a top view of an LGP according to a seventh embodiment of the present invention. FIG. 13 is a top view of an LGP according to an eighth embodiment of the present invention. Referring to FIGS. 12 and 13, optical microstructures 13 configured with three different geometrical shapes are irregularly arranged, some of which are jointed together. As shown in FIG. 12, with respect to the jointed optical microstructures of different geometrical shapes, different shapes are featured with different heights above the LGP surface or different depth lower from the LGP surface. As shown in FIG. 13, with respect to the jointed optical microstructures of different geometrical shapes, different shapes are featured with a same height above the LGP surface or a same depth lower from the LGP surface.

Figure 5:
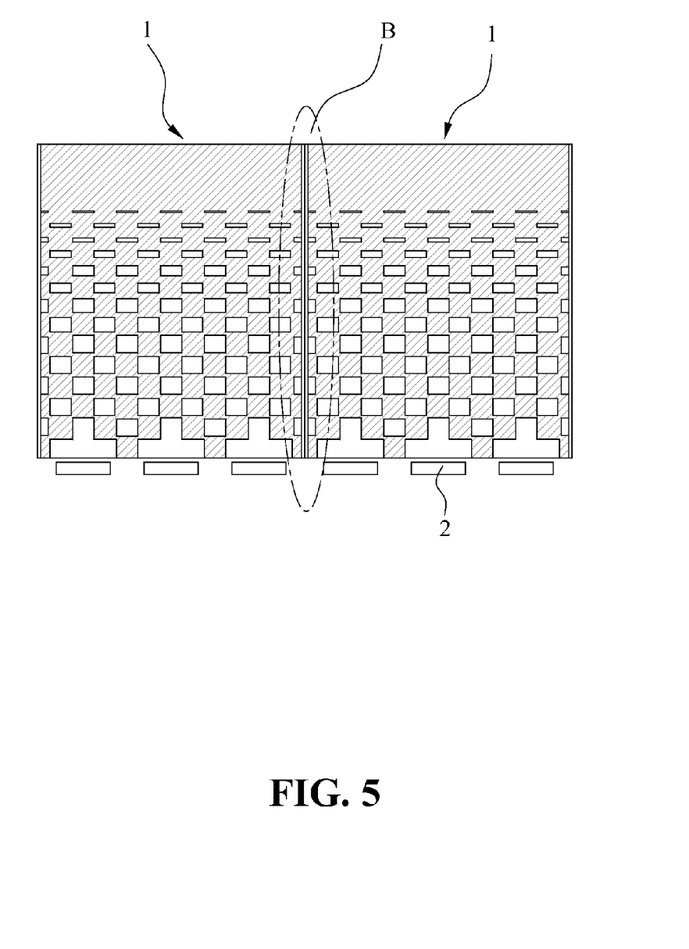
FIG. 5 is a schematic diagram illustrating the two small-size LGPs spliced into a whole.
Figure 6:
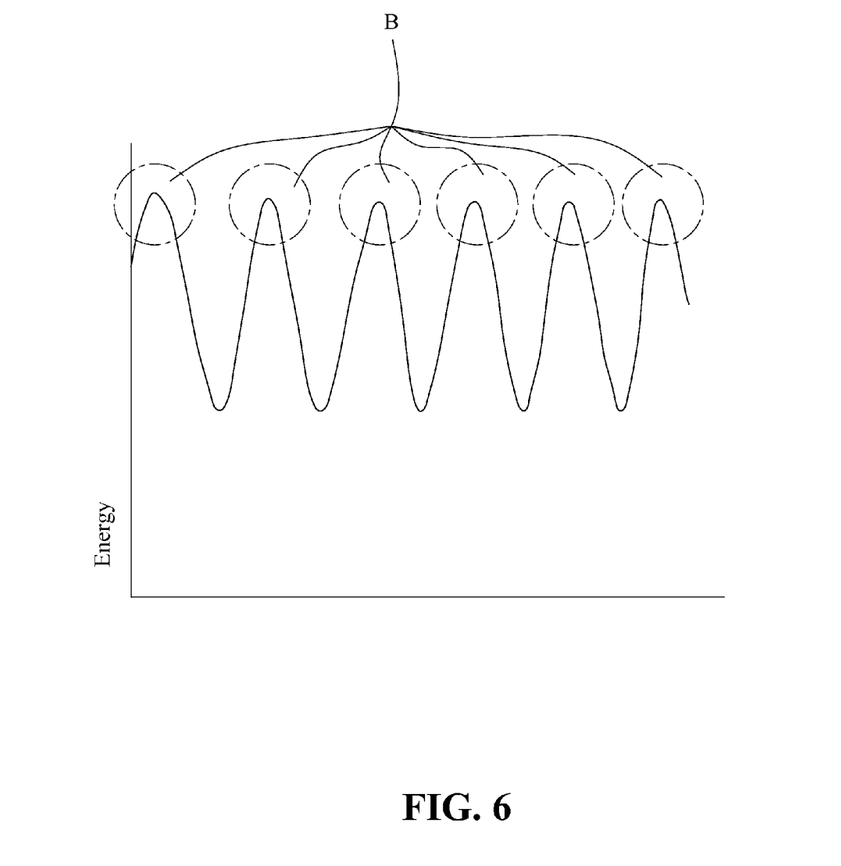
FIG. 6 illustrates the bright line distribution on the spliced two small-size LGP.

FIG. 5 is a schematic diagram illustrating the two small-size LGPs spliced into a whole. Referring to FIG. 5, although two splicing edges A of the two small-size LGPs 1 are spliced, and generate a bright line area B, the rest areas of the LGPs 1 are affected by the optical microstructures 13 and the optical sub-microstructures 15 and generate an identical and uniformly distributed bright line area B. As such, the bright line area B of the splicing edges A is then absorbed as a part of the entire bright line area B. FIG. 6 illustrates the bright line distribution on the spliced two small-size LGP. As shown in FIG. 6, facilitated with the optical microstructures 13 and the optical sub-microstructures 15 which refract and reflect the light transmitted through the LGP 1, the bright lines caused at the splicing portions between adjacent small-size LGPs 1 can be visually eliminated.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for uniforming light emitted from a backlight module, the backlight module comprising a light guide plate (LGP), the method comprising:
   providing a plurality of optical microstructures on the LGP, wherein each of the optical microstructures comprises a plurality of optical sub-microstructures; and
   providing at least one light source at a light input surface, wherein a distribution intensity of the optical microstructures on the LGP increases as the optical microstructures are farther from the light source along X-axis and Y-axis, a distribution intensity of the optical sub-microstructures on the optical microstructure increases as the optical sub-microstructures are farther from the light source along X-axis and Y-axis, and the optical sub-microstructures vary along Z-axis as the optical sub-microstructures are further from the light source, wherein X-axis is defined along a lateral side of the LGP at which the light input surface is configured, Y-axis is defined along another lateral side of the LGP, and Z-axis is defined as being perpendicular with X-axis and Y-axis.

2. The method as claimed in claim 1, wherein the optical sub-microstructures are protrusions protruded over a surface of the LGP along Z-axis, and a height of each of the protrusions is proportional with a distance between the light source and the protrusion.

3. The method as claimed in claim 1, wherein the optical sub-microstructures are recesses recessed from a surface of the LGP along Z-axis, and a depth of each of the recesses is proportional with a distance between the light source and the recess.

4. The method as claimed in claim 1, wherein the optical microstructures are formed with square shapes.

5. The method as claimed in claim 1, wherein the optical microstructures are formed with rectangular shapes.

6. The method as claimed in claim 1, wherein the optical microstructures are formed with rhombus shapes.

7. The method as claimed in claim 1, wherein the optical microstructures are formed with round shapes.

8. The method as claimed in claim 1, wherein the optical microstructures are formed with elliptical shapes.

9. The method as claimed in claim 1, wherein the optical microstructures are formed with triangle shapes.

10. The method as claimed in claim 1, wherein the optical microstructures are formed with wave shapes.

11. The method as claimed in claim 1, wherein the optical microstructures are formed with a plurality of geometrical shapes regularly or irregularly arranged.

12. The method as claimed in claim 11, wherein the optical microstructures of different geometrical shapes are partially jointed and overlapped with each other.

13. The method as claimed in claim 11, wherein the optical microstructures of different geometrical shapes have same or different heights protruded above the surface of the LGP.

14. The method as claimed in claim 11, wherein the optical microstructures of different geometrical shapes have same or different depths recessed from the surface of the LGP.

15. The method as claimed in claim 1, wherein the LGP is obtained by splicing a plurality of small-size LGPs.

16. The method as claimed in claim 1, wherein the optical sub-microstructures are distributed on each optical microstructure in a manner similar to that of the optical microstructures distributed on the LGP.

17. The method as claimed in claim 1, wherein the optical microstructures are configured at a light emitting surface of the LGP.

18. The method as claimed in claim 1, wherein the optical microstructures are configured at a surface of the LGP opposite to a light emitting surface of the LGP.

19. The method as claimed in claim 1, wherein the optical microstructures are configured at a light emitting surface of the LGP and a surface of the LGP opposite to the light emitting surface of the LGP.

20. A backlight module light uniforming structure, comprising:
   at least one light source;
   a light guide plate (LGP) having a light input surface, wherein the light source is provided corresponding to the light input surface, wherein the LGP comprises a plurality of optical microstructures, and each of the optical microstructures comprises a plurality of optical sub-microstructures,
   wherein a distribution intensity of the optical microstructures on the LGP increases as the optical microstructures are farther from the light source along X-axis and Y-axis, a distribution intensity of the optical sub-microstructures on the optical microstructure increases as the optical sub-microstructures are farther from the light source along X-axis and Y-axis, and the optical sub-microstructures vary along Z-axis as the optical sub-microstructures are farther from the light source, wherein X-axis is defined along a lateral side of the LGP at which the light input surface is configured, Y-axis is defined along another lateral side of the LGP, and Z-axis is defined as being perpendicular with X-axis and Y-axis.

21. The backlight module light uniforming structure as claimed in claim 20, wherein the optical sub-microstructures are protrusions protruded over a surface of the LGP along Z-axis, and a height of each of the protrusions is proportional with a distance between the light source and the protrusion.

22. The backlight module light uniforming structure as claimed in claim 20, wherein the optical sub-microstructures are recesses recessed from a surface of the LGP along Z-axis, and a depth of each of the recesses is proportional with a distance between the light source and the recess.

23. The backlight module light uniforming structure as claimed in claim 20, wherein the optical microstructures are formed with square shapes.

24. The backlight module light uniforming structure as claimed in claim 20, wherein the optical microstructures are formed with rectangular shapes.

25. The backlight module light uniforming structure as claimed in claim 20, wherein the optical microstructures are formed with rhombus shapes.

26. The backlight module light uniforming structure as claimed in claim 20, wherein the optical microstructures are formed with round shapes.

27. The backlight module light uniforming structure as claimed in claim 20, wherein the optical microstructures are formed with elliptical shapes.

28. The backlight module light uniforming structure as claimed in claim 20, wherein the optical microstructures are formed with triangle shapes.

29. The backlight module light uniforming structure as claimed in claim 20, wherein the optical microstructures are formed with wave shapes.

30. The backlight module light uniforming structure as claimed in claim 20, wherein the optical microstructures are formed with a plurality of geometrical shapes regularly or irregularly arranged.

31. The backlight module light uniforming structure as claimed in claim 30, wherein the optical microstructures of different geometrical shapes are partially jointed and overlapped with each other.

32. The backlight module light uniforming structure as claimed in claim 30, wherein the optical microstructures of different geometrical shapes have same or different heights protruded above the surface of the LGP.

33. The backlight module light uniforming structure as claimed in claim 30, wherein the optical microstructures of different geometrical shapes have same or different depths recessed from the surface of the LGP.

34. The backlight module light uniforming structure as claimed in claim 20, wherein the LGP is obtained by splicing a plurality of small-size LGPs.

35. The backlight module light uniforming structure as claimed in claim 20, wherein the optical sub-microstructures are distributed on each optical microstructure in a manner similar to that of the optical microstructures distributed on the LGP.

36. The backlight module light uniforming structure as claimed in claim 20, wherein the optical microstructures are configured at a light emitting surface of the LGP.

37. The backlight module light uniforming structure as claimed in claim 20, wherein the optical microstructures are configured at a surface of the LGP opposite to a light emitting surface of the LGP.

38. The backlight module light uniforming structure as claimed in claim 20, wherein the optical microstructures are configured at a light emitting surface of the LGP and a surface of the LGP opposite to the light emitting surface of the LGP.

39. A method for uniforming light emitted from a backlight module, the backlight module comprising a light guide plate (LGP), the method comprising:
providing a plurality of optical microstructures on the LGP, wherein each of the optical microstructures comprises a plurality of optical sub-microstructures and at least some of the optical microstructures are jointed together; and
providing at least one light source at a light input surface, wherein a distribution intensity of the optical microstructures on the LGP increases as the optical microstructures are farther from the light source along X-axis and Y-axis, and a distribution intensity of the optical sub-microstructures on the optical microstructure increases as the optical sub-microstructures are farther from the light source along X-axis and Y-axis, wherein X-axis is defined along a lateral side of the LGP at which the light input surface is configured, and Y-axis is defined along another lateral side of the LGP.

40. A method for uniforming light emitted from a backlight module, the backlight module comprising a light guide plate (LGP), the method comprising:
providing a plurality of optical microstructures on the LGP, wherein each of the optical microstructures comprises a plurality of optical sub-microstructures and at least some of the optical sub-microstructures are jointed together; and
providing at least one light source at a light input surface, wherein a distribution intensity of the optical microstructures on the LGP increases as the optical microstructures are farther from the light source along X-axis and Y-axis, and a distribution intensity of the optical sub-microstructures on the optical microstructure increases as the optical sub-microstructures are farther from the light source along X-axis and Y-axis, wherein X-axis is defined along a lateral side of the LGP at which the light input surface is configured, and Y-axis is defined along another lateral side of the LGP.

41. A backlight module light uniforming structure, comprising:
at least one light source;
a light guide plate (LGP) having a light input surface, wherein the light source is provided corresponding to the light input surface, wherein the LGP comprises a plurality of optical microstructures, each of the optical microstructures comprises a plurality of optical sub-microstructures and at least some of the optical microstructures are jointed together,
wherein a distribution intensity of the optical microstructures on the LGP increases as the optical microstructures are farther from the light source along X-axis and Y-axis, and a distribution intensity of the optical sub-microstructures on the optical microstructure increases as the optical sub-microstructures are farther from the light source along X-axis and Y-axis, wherein X-axis is defined along a lateral side of the LGP at which the light input surface is configured, and Y-axis is defined along another lateral side of the LGP.

42. A backlight module light uniforming structure, comprising:
at least one light source;
a light guide plate (LGP) having a light input surface, wherein the light source is provided corresponding to the light input surface, wherein the LGP comprises a plurality of optical microstructures, each of the optical microstructures comprises a plurality of optical sub-microstructures and at least some of the optical sub-microstructures are jointed together,
wherein a distribution intensity of the optical microstructures on the LGP increases as the optical microstructures are farther from the light source along X-axis and Y-axis, and a distribution intensity of the optical sub-microstructures on the optical microstructure increases as the optical sub-microstructures are farther from the light source along X-axis and Y-axis, wherein X-axis is defined along a lateral side of the LGP at which the light input surface is configured, and Y-axis is defined along another lateral side of the LGP.

* * * * *